United States Patent [19]

Brenner

[11] 4,390,088
[45] Jun. 28, 1983

[54] CONTAINER BAG SYSTEM FOR BICYCLES

[76] Inventor: Richard K. Brenner, 2338 18th Ave., Forest Grove, Oreg. 97116

[21] Appl. No.: 232,233

[22] Filed: Feb. 6, 1981

Related U.S. Application Data

[63] Continuation-in-part of Ser. No. 17,370, Mar. 5, 1979, abandoned.

[51] Int. Cl.³ .............................................. A45C 13/02
[52] U.S. Cl. ...................................... 190/51; 190/43; 224/32 R; 224/32 A; 280/289 A
[58] Field of Search ............... 224/32 A, 32 R, 33 A, 224/33 R, 35; 220/289 A; 150/28 R, 31; 190/42, 43, 49, 50, 51

[56] References Cited

U.S. PATENT DOCUMENTS

| | | | |
|---|---|---|---|
| 1,274,003 | 7/1918 | Christie | 190/51 |
| 1,387,597 | 8/1921 | Fetters | 190/43 |
| 3,874,574 | 4/1975 | Heise | 224/32 A X |
| 4,003,508 | 1/1977 | Hoops | 224/32 R |
| 4,059,207 | 11/1977 | Jackson et al. | 280/289 A X |
| 4,161,201 | 7/1979 | Carp | 190/51 X |
| 4,174,795 | 11/1979 | Jackson et al. | 224/32 A |

Primary Examiner—Steven M. Pollard

[57] ABSTRACT

A double container bag system for collapsible bicycles and the like is disclosed. The bag system serves as a protective container for transporting either a collapsible or a conventional bicycle. The system includes a series of double walled pockets sewn into the various disclosed bags and into which are inserted foldable panels. These panels and the bicycle container bag are fitted into a second container which becomes a saddle bag which fits over the rear of the bicycle when it is in use. Some of the parts of the disclosed system can be rearranged so as to join and form a hand carried piece of luggage.

18 Claims, 6 Drawing Figures

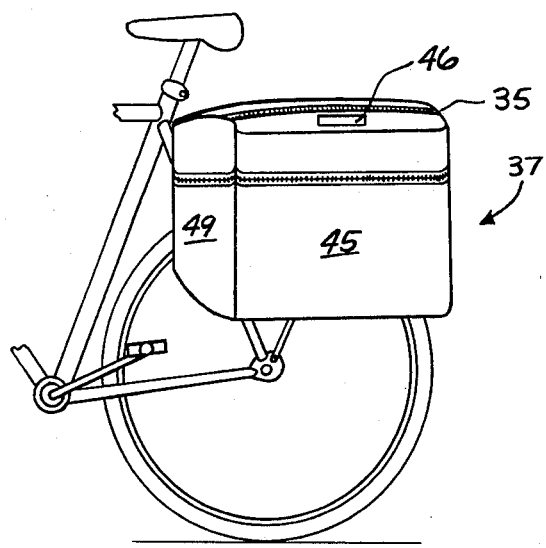
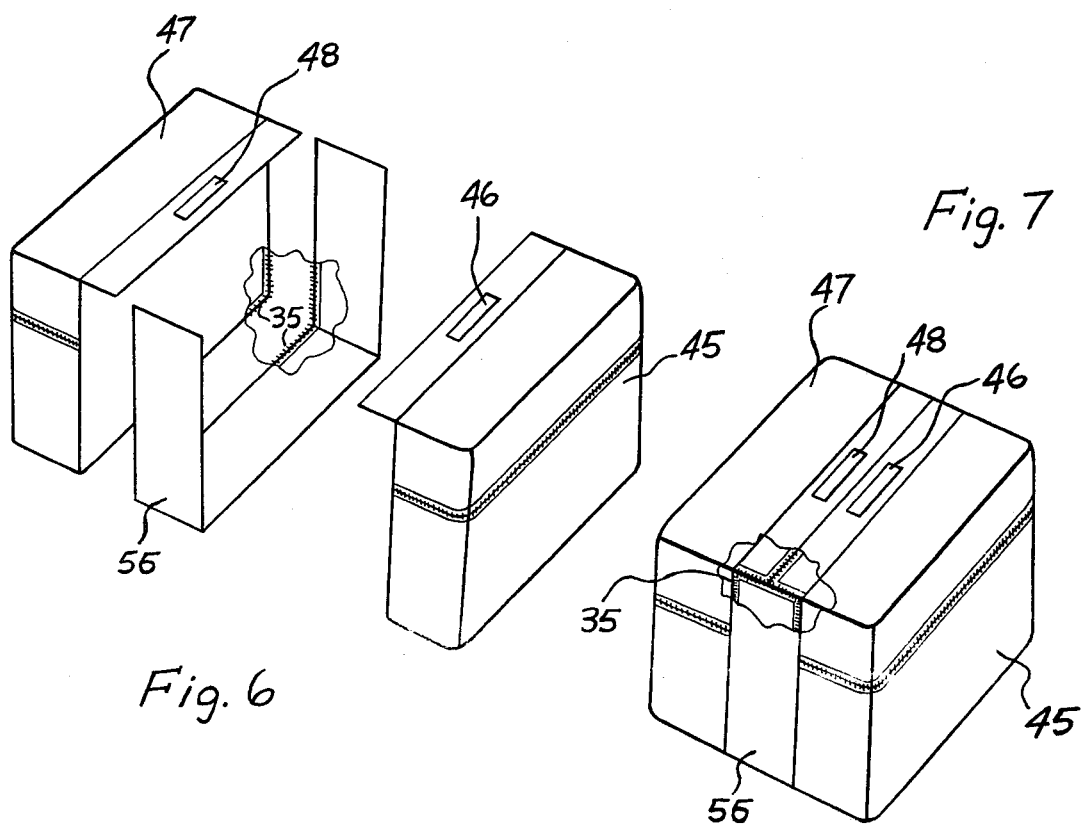

CONTAINER BAG SYSTEM FOR BICYCLES

This application is a continuation-in-part of pending application Ser. No. 17,370, filed Mar. 5, 1979.

BACKGROUND OF THE INVENTION

1. Field of the Invention

The invention pertains to bicycle container systems generally and more particularly to those comprised of multiple containers reinforced by rigid panels and which include parts which may be joined together to form hand carried luggage.

2. Description of the Prior Art

Bicycle containers exist in the prior art which are used to transport the bicycle aboard commercial aircraft or other public transportation. Such devices conventionally take the form of a box of corrugated cardboard sized to accomodate a bicycle. The box is usually packed with appropriate cushioning material to protect the bicycle. Such box type containers are not easily transportable and often must be left behind at a central storage point to be reclaimed on a return trip. This presents a problem in finding a suitable place to store the container and limits the use of further public transportation at a later time during a tour. Often the traveler must purchase and store several containers at varied points along his desired route. It is also inconvenient for the traveler to disembark from public transportation and not be able to immediately use the bicycle for want of a place to store the container. The present invention solves the problem of what to do with the container by incorporating it into a saddle bag to be used with the bicycle as it is ridden.

SUMMARY OF THE INVENTION

A principal object of the invention is to provide an improved bicycle shipping and carrying container for transporting either collapsible or conventional bicycles.

A further object of the invention is to provide a bicycle container which is collapsible into a relatively small package.

A further object of the invention is to provide a collapsible bicycle container which may be folded to become part of a bicycle saddle bag.

A further object of the invention is to provide a container, the parts of which may be used to form hand luggage for the bicycle operator, or which may be used as a part of a saddle bag on the bicycle.

BRIEF DESCRIPTION OF THE DRAWINGS

The present invention is illustrated in the accompanying drawings, wherein:

FIG. 5 is a side elevation showing the assembled saddle bag of FIG. 4 mounted on the rear of a bicycle.

FIG. 6 is a perspective view of the detachable containers shown in FIG. 3, together with a center section which joins them to form a single piece of hand luggage.

FIG. 7 is a perspective view showing the elements of FIG. 6 as assembled.

DESCRIPTION OF THE PREFERRED EMBODIMENTS

Figure 1:
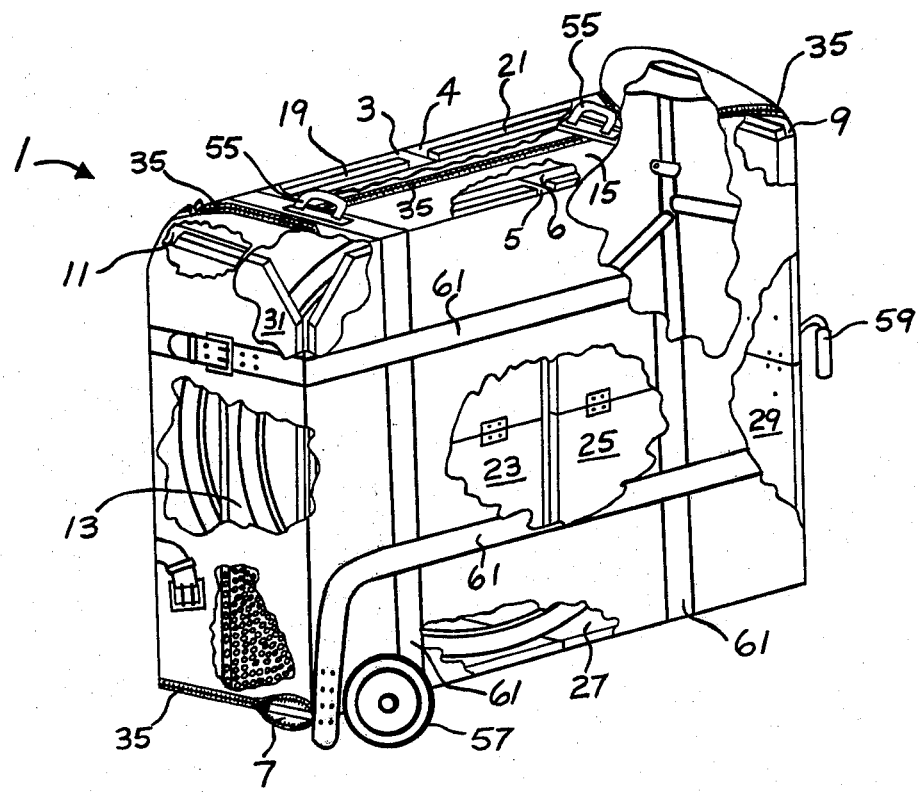
FIG. 1 is a perspective view of the bicycle transporting container bag partially broken away to show a bicycle therein and to further show internal details of the construction.

Referring now to the drawings, FIG. 1 shows a transporting container bag for a collapsible bicycle. The bicycle transporting container bag is designated generally by the Numeral 1. The bag 1 is comprised of a plurality of double walled panel receiving pockets as follows: First and second side pockets 3 and 4 are operatively connected to a third and fourth side pocket 5 and 6 by a bottom pocket 7. A first end pocket 9 is attached to side pockets 4 and 6 and to bottom pocket 7. A second end pocket 11 is attached to side pockets 3 and 5 and to bottom pocket 7 opposite pocket 9. Attachment of these pockets to one another may be achieved through use of a zipper or by sewing them together.

An interior compartment 13 is attached to and runs between end pockets 9 and 11. A top 15 is attached to side pockets 3, 4, 5, and 6 to end pockets 9 and 11. Top 15 may be opened and closed to permit insertion of a bicycle within the interior of bag 1. Compartment 13 partitions bag 1 into separate sections for holding each half of a collapsible bicycle. Compartment 13 is double walled and may be filled with any easily obtained resilient material or the user's clothes to cushion the collapsed bicycle sections against damage. The bicycle parts within the interior of bag 1 may be secured by any suitable arrangement such as tie-down straps to prevent movement.

Figure 2:
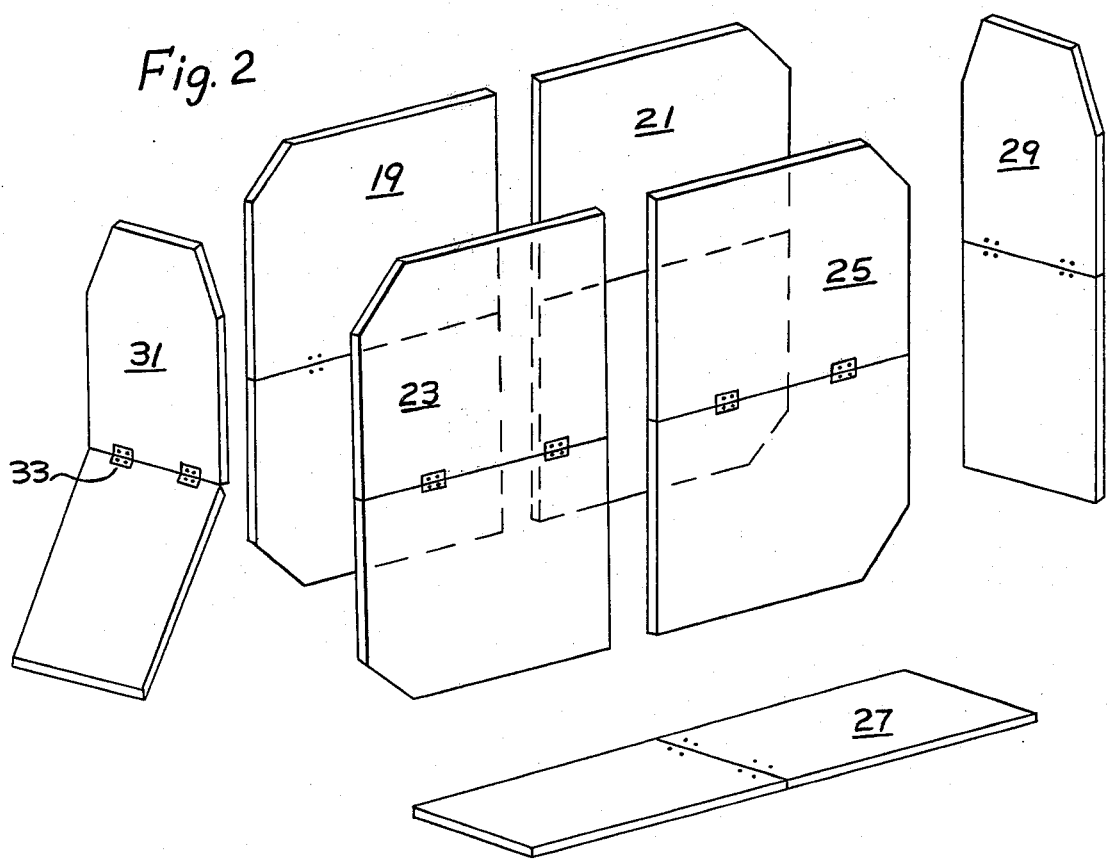
FIG. 2 is an exploded perspective view of the foldable panels of the container bag shown in FIG. 1, showing their relationship to one another within the pockets of the bag of FIG. 1.

As previously noted, pockets 3, 4, 5, 6, 7, 9, and 11 each have inner and outer walls so as to hold removable panels as shown in FIG. 2. It is readily seen that bag 1 may be used for conventional uncollapsed bicycles merely by increasing the length of the pockets and top and by adding additional panels similar to those shown in FIG. 2.

Removable panels 19, 21, 23, 25, 27, 29, and 31 as shown in FIG. 2, fit into pockets 3, 4, 5, 6, 7, 9, and 11 in bag 1 of FIG. 1 as follows: Panels 19 and 21 go into pockets 3 and 4. Panels 23 and 25 go into pockets 5 and 6. Panel 27 goes into bottom pocket 7. Panel 29 goes into end pocket 9. Panel 31 goes into end pocket 11. The panels shown in FIG. 2 are equipped with hinges 33 so that they may be folded. Other panel and pocket arrangements with cross stitching to create additional pockets which may permit panels without hinges or removable discardable panels from material such as cardboard or newspapers are possible in alternative embodiments of the invention. Other means of attachment of panels 19, 21, 23, 25, 27, 29, and 31 to bag 1 other than pockets, such as the use of snap fasteners and single wall bag construction, may also occur to those skilled in the art. In the preferred embodiment of the invention, panels 19, 21, 23, 25, 27, 29, and 31 are made from lightweight but rigid material such as thin plywood, aluminum, or fiberglass and are a permanent part of the container system. Panels 19, 21, 23, and 25 are beveled on two corners as shown in FIG. 2. These bevels provide clearance for the feet of a bicycle rider when the invention is carried on the rear of a bicycle. Panels 29 and 31 are beveled only on one end, as shown in FIG. 2 to allow the top 15 of bag 1 to be drawn together for closing and to conform with the beveled corners of panels 19, 21, 23, and 25.

To hold panels 19, 21, 23, 25, 27, 29, and 31 more securely within the respective pockets in bag 1, the upper portions of pockets 3, 4, 5, 6, 9, and 11 may be provided with zippers. Top 15 is also provided with closing zippers. All the zippers are of conventional heavy duty jacket-type and are designated by the single numeral 35.

Figure 3:
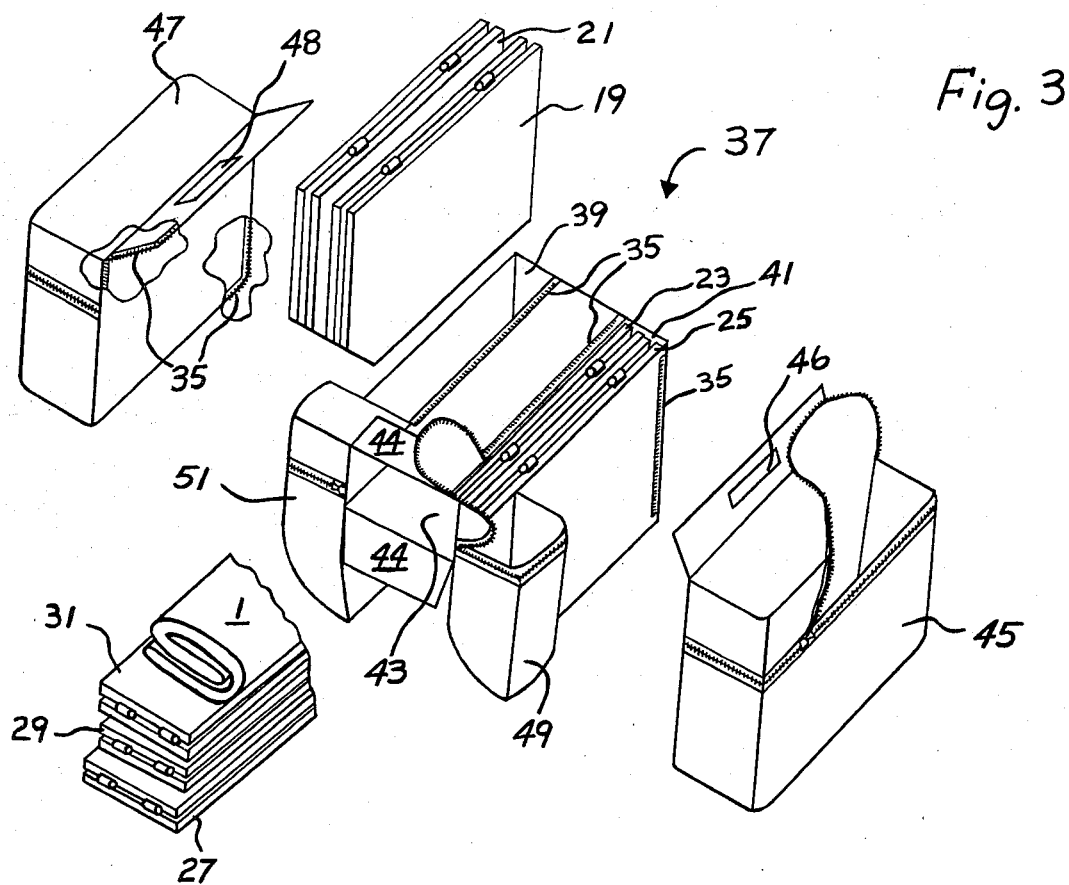
FIG. 3 is a perspective view of a saddle bag which is designed to hold the bicycle transporting container bag of FIG. 1 and the folding panels. Also shown are two detachable containers which may be joined for use as hand luggage.

FIG. 3 shows the construction of the saddle bag which carries bag 1 and its associated panels. The saddle bag is designated by the numeral 37 and contains pocket 39 for holding panels 19 and 21. A second pocket 41 holds panels 23 and 25. A horizontally disposed pocket 43 joining pockets 39 and 41 holds bicycle transporting container bag 1 and panels 27, 29, and 31. Luggage style containers 45 and 47 are detachable and have flaps 46 and 48 respectively which serve as handles for carrying the containers. Bag 37 defines two end pouches 49 and 51 which are designed to hold items such as tools and spare parts.

Pockets 39 and 41 are closed at their top by the addition of detachable containers 45 and 47. Zippers 35 provide the means of attachment to bag 37. Pocket 43 is provided with flaps 44 having conventional snap fasteners (not shown) to hold bag 1 and panels 27, 29, and 31 securely therein.

An alternate form of construction for bag 37 could exclude detachable containers 45 and 47 with pockets 39 and 41 closed by additional flaps and zippers.

Figure 4:
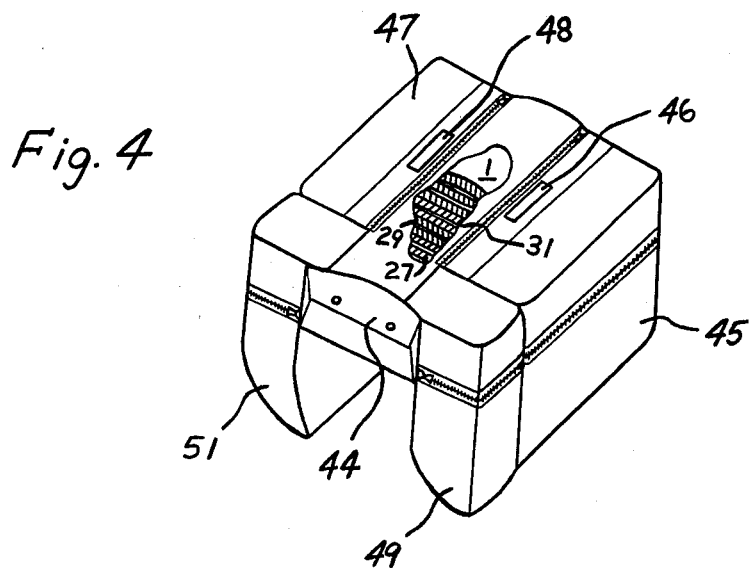
FIG. 4 is a perspective view of the saddle bag of FIG. 3 with the detachable containers attached and the bicycle transporting container bag of FIG. 1 and its panels folded and inserted within ready for attachment to the rear of a bicycle.

FIG. 4 shows bag 37 with containers 45 and 47 attached and with bag 1 and panels 27, 29, and 31 secured within pocket 43.

As shown in FIG. 5, bag 37 may be mounted on the rear of a bicycle equipped with a conventional luggage carrier with pouches 49 and 51 facing forward. To aid in rigidly securing bag 37 to a luggage carrier, it is suggested that folded panel 27 and the bottom of pocket 43 be provided with two aligned sets of holes so that the bag 3 can be bolted to the luggage carrier. Adaptations of this or other methods of securing bag 37 to the rear of a bicycle will occur to those skilled in the art.

In an alternative embodiment of the invention, the bag 37 could be mounted on the front section of a bicycle by attachment to a front mounted luggage carrier over the front wheel.

FIG. 6 shows an alternate assembly disclosing the relationship of luggage containers 45 and 47 of FIG. 3 with a center joining section 56. Containers 45 and 47 are joined together with zippers 35 and center joining section 56 to form a single piece of hand luggage as illustrated by FIG. 7. The zippers 35 of center joining section 56 are complementary to the zipper halves attached to containers 45 and 47, which have their complementary halves attached to bag 37.

To aid in the use of the invention, the following accessories are suggested: Two conventional type luggage handles 55 for lifting bag 1, a wheeled dolly 57 for ease of moving bag 1, and a handle 59 for holding and guiding bag 1 while using wheeled dolly 57. The luggage handles 55 for lifting bag 1 are shown as secured to wide reinforced belts 61. These belts can be arranged in the form of a sling and placed both horizontally and vertically around the sides of bag 1. Lifting bag 1 by this method protects the bag from damage and provides greater stability. The wheeled dolly 57 can be constructed using dismountable hardware so that the wheels and other parts along with the handles 55 and reinforcing belts 61 can be stored in pouches 49 and 51 of bag 37.

The previous description of the form and arrangement of bags 1 and 37 with their many pockets and removable panels is the preferred one. Other forms and arrangements will occur to those skilled in the art. I claim all such arrangements as follows in the true spirit and scope of the invention in the appended claims.

What is claimed is:

1. A bicycle transporting container system comprising:
 a first bicycle bag defining an inner pocket;
 a second bicycle transporting container bag insertable in the inner pocket of the first bag;
 means for reinforcing the sides of the second bicycle transporting container bag,
 said reinforcing means comprising a rigid panel,
 said rigid panel being hinged to permit folding;
 and a detachable luggage style container operatively connected to the first bag.

2. Apparatus according to claim 1 wherein the reinforcing means comprises a rigid removable panel.

3. Apparatus according to claim 2 wherein there are means for reinforcing the ends of the second bicycle transporting container bag,
 said reinforcing means comprising a rigid removable panel,
 said rigid removable panel being hinged to permit folding.

4. Apparatus according to claim 2 wherein there are means for reinforcing the bottom of the second bicycle transporting container bag,
 said reinforcing means comprising a rigid removable panel,
 said rigid removable panel being hinged to permit folding.

5. A bicycle transporting container system comprising:
 a first bag defining a bicycle transporting container bag pocket and a plurality of panel receiving pockets;
 a second bicycle transporting container bag within the container bag pocket of the first bag;
 means for reinforcing the sides, ends, and bottom of the second bicycle transporting container bag;
 said reinforcing means comprised of a rigid removable panel adapted for insertion into the pockets of the first bag wherein the second bicycle transporting container bag forms a rigid enclosure for the bicycle which can be collapsed and carried within the first bag.

6. Apparatus according to claim 5 wherein the rigid removable panel is hinged to permit folding.

7. Apparatus according to claim 5 wherein there is a detachable container on the first bag;
 a second detachable container opposite the first detachable container; and a connecting member for joining the first and second detachable containers, while separated from the first bag, to form a unitary article of luggage.

8. A bicycle transporting container system comprising:

a first bag defining a bicycle transporting container bag pocket attachable to a conventional bicycle luggage carrier and a plurality of panel receiving pockets opposite the transporting container bag pocket;

a second bicycle transporting container bag within the container bag pocket of the first bag, said second bicycle transporting container bag defining a plurality of reinforcing panel pockets;

a plurality of reinforcing panels adapted to be removably insertable into said reinforcing panel pockets whereby the reinforcing panels and pockets form a rigid enclosure for the bicycle and whereby the reinforcing panels may be carried within the panel receiving pockets and container bag pocket of the first bag.

9. Apparatus according to claim 8 wherein the plurality of reinforcing panels are hinged to permit folding.

10. A bicycle transporting container system comprising:

a bicycle transporting container bag defining a bottom pocket, a plurality of opposing side pockets, and two opposing end pockets;

a bottom panel adapted to removably fit into the bottom pocket, said bottom panel sectioned into pieces adaptable for placement on top of a conventional bicycle luggage carrier;

a plurality of side panels adapted to removably fit into the plurality of opposing side pockets, said plurality of side panels sectioned into pieces adaptable for placement along opposing sides of a bicycle wheel as the bicycle is operational;

an end panel adapted to removably fit into one opposing end pocket, said end panel sectioned into pieces adaptable for placement on top of a conventional bicycle luggage carrier;

a second end panel adapted to removably fit into the second opposing end pocket, said second end panel sectioned into pieces adaptable for placement on top of a conventional bicycle luggage carrier;

a plurality of top flaps whereby the two opposing end pockets and plurality of opposing side pockets are joined to form a closed top for said bicycle transporting container bag;

means for fastening said top flaps whereby the bicycle is secured within the interior of said bicycle transporting container bag, said pockets and panels form a rigid enclosure for the bicycle, and whereby the enclosure may be collapsed and adapted to being carried on a bicycle.

11. Apparatus according to claim 10 wherein the bottom panel, plurality of side panels, and end panels are hinged to permit folding.

12. Apparatus according to claim 10 wherein the bicycle transporting container bag is provided with an interior partition joining the two opposing end pockets, said interior partition being double walled whereby resilient material may be inserted to cushion the bicycle.

13. Apparatus according to claim 10 wherein the bottom pocket and two opposing end pockets are cross-stitched to form additional pockets for holding a corresponding number of sectioned bottom and end panels.

14. A bicycle transporting container system comprising:

a first bag attachable to a conventional bicycle luggage carrier and defining a horizontally disposed bicycle transporting container bag pocket along with two vertically disposed panel receiving pockets located on opposing sides of the transporting container bag pocket;

a second bicycle transporting container bag within the container bag pocket of the first bag, said second bicycle transporting container bag defining a plurality of opposing side reinforcing panel receiving pockets, a plurality of opposing end reinforcing panel receiving pockets, and a bottom reinforcing panel receiving pocket;

a plurality of reinforcing side panels adapted to be removably insertable into a like number of opposing side panel receiving pockets of the second bicycle transporting container bag, said side panels adapted to be removably insertable into the two opposing panel receiving pockets of the first bag;

a plurality of reinforcing end panels adapted to be removably insertable into a like number of opposing end panel receiving pockets of the second bicycle transporting container bag, said end panels adapted to be removably insertable into the container bag pocket of the first bag;

a reinforcing bottom panel adapted to be removably insertable into the bottom panel receiving pocket of the second bicycle transporting container bag, said bottom panel adapted to be removably insertable into the container bag pocket of the first bag whereby the side, end, and bottom panels of the second bicycle transporting container bag form a rigid enclosure for the bicycle and whereby the second bicycle transporting container bag may be collapsed and carried within the first bag.

15. Apparatus according to claim 14 wherein the bottom panel, plurality of side panels, and plurality of end panels are hinged to permit folding.

16. Apparatus according to claim 14 wherein the bottom panel, plurality of side panels, and plurality of end panels are bisected to reduce their size for carrying.

17. Apparatus according to claim 16 wherein the plurality of opposing side reinforcing panel receiving pockets, plurality of opposing end reinforcing panel receiving pockets, and bottom reinforcing panel receiving pockets of the second bicycle transporting container bag are cross-stitched to hold a corresponding number of bisected side, end, and bottom panels.

18. A bicycle transporting container system comprising:

a first bag defining a bicycle transporting container bag pocket and a plurality of panel receiving pockets;

a detachable container operatively connected to a panel receiving pocket on the first bag;

a second detachable container operatively connected to a panel receiving pocket opposite the first detachable container;

means for joining the first and second detachable containers by a connecting member to form a unitary article of luggage;

a plurality of carrying pouches mounted adjacent to the detachable containers;

a bicycle transporting container bag within the pocket on the first bag;

said second bicycle transporting container bag defining a plurality of hollow walls;

means for reinforcing the sides, ends, and bottom of the second bicycle transporting container bag whereby the reinforcing means and hollow walls form a rigid enclosure for the bicycle;

each said reinforcing means comprising a rigid removable panel, each said rigid panel hinged to permit folding, each said rigid panel adapted to removably fit into the bicycle transporting bag pocket and plurality of panel receiving pockets of the first bag;

and a hollow walled interior partition within the bicycle transporting container bag.

* * * * *